(12) United States Patent
Chen et al.

(10) Patent No.: US 12,348,463 B2
(45) Date of Patent: Jul. 1, 2025

(54) FRAME STRUCTURE DESIGN FOR DOWNLINK TDD-TDD CARRIER AGGREGATION WITH PUSCH-LESS CELL

(71) Applicant: QUALCOMM Incorporated, San Diego, CA (US)

(72) Inventors: Bo Chen, Beijing (CN); Mingkai Nan, Beijing (CN); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 17/917,546

(22) PCT Filed: Apr. 23, 2021

(86) PCT No.: PCT/CN2021/089366
§ 371 (c)(1),
(2) Date: Oct. 6, 2022

(87) PCT Pub. No.: WO2021/218824
PCT Pub. Date: Nov. 4, 2021

(65) Prior Publication Data
US 2023/0171080 A1    Jun. 1, 2023

(30) Foreign Application Priority Data
Apr. 28, 2020  (WO) ................ PCT/CN2020/087537

(51) Int. Cl.
*H04L 5/00* (2006.01)
*H04L 5/14* (2006.01)

(52) U.S. Cl.
CPC ............ *H04L 5/1469* (2013.01); *H04L 5/001* (2013.01); *H04L 5/0051* (2013.01)

(58) Field of Classification Search
CPC .... H04W 72/0446; H04W 72/21; H04L 5/00; H04L 5/14
See application file for complete search history.

(56) References Cited

U.S. PATENT DOCUMENTS 11,153,126 B2 * 10/2021 He ...................... H04L 25/0226
11,968,641 B2 *  4/2024 Kim ..................... H04W 56/00
(Continued)

FOREIGN PATENT DOCUMENTS

| CN | 103796286 A | 5/2014 |
| CN | 104012017 A | 8/2014 |

(Continued)

OTHER PUBLICATIONS

NPL-Ericsson: "Correction in SRS Switching Requirements", 3GPP TSG-RN WG4 Meeting #86 bis, R4-1804692, Melbourne, Australia, Apr. 16-20, 2018, Apr. 24, 2018, 3 Pages (Year: 2018).*
(Continued)

*Primary Examiner* — Lan-Huong Truong
(74) *Attorney, Agent, or Firm* — Haynes and Boone, LLP

(57) ABSTRACT

Wireless communications systems and methods related to transmitting communication signals with a carrier aggregated (CA) system TDD bands of a primary carrier component (PCC) and a secondary carrier component (SCC) PUSCH-less cell are provided. In particular, a CA frame structure with a PCC primary frame and an SCC secondary frame where a sounding reference signal (SRS) transmitted on the SCC secondary frame corresponds to a downlink slot on the PCC primary frame to avoid throughput loss. In some embodiments, the CA frame can be arranged such that at least one of the uplink slots on the PCC frame corresponds with downlink slots on the SCC frame.

28 Claims, 12 Drawing Sheets

(56) References Cited

U.S. PATENT DOCUMENTS

| | | | |
|---|---|---|---|
| 2015/0139175 | A1 | 5/2015 | Ratasuk et al. |
| 2016/0323842 | A1 | 11/2016 | Dinan |
| 2017/0163389 | A1 | 6/2017 | Fu et al. |
| 2019/0319824 | A1 | 10/2019 | Rico Alvarino et al. |
| 2020/0021422 | A1 | 1/2020 | Chen et al. |
| 2021/0126753 | A1* | 4/2021 | Mochizuki ............ H04L 5/0037 |

FOREIGN PATENT DOCUMENTS

| | | | | |
|---|---|---|---|---|
| CN | 104584475 | A | 4/2015 | |
| CN | 111066361 | A | 4/2020 | |
| WO | 2015196483 | A1 | 12/2015 | |
| WO | 2018005481 | | 1/2018 | |
| WO | WO-2018005481 | A1 * | 1/2018 | ............. H04L 12/28 |
| WO | 2018081597 | A1 | 5/2018 | |

OTHER PUBLICATIONS

Ericsson: "Correction in SRS Switching Requirements", 3GPP TSG-RN WG4 Meeting #86bis, R4-1804692, Melbourne, Australia, Apr. 16-20, 2018, Apr. 24, 2018 (Apr. 24, 2018) the Whole Document, 3 Pages.

International Search Report and Written Opinion - PCT/CN2020/087537—ISA/EPO—Jan. 26, 2021.

International Search Report and Written Opinion—PCT/CN2021/089366—ISA/EPO—Jul. 5, 2021.

Supplementary European Search Report—EP21797688—Search Authority—The Hague—Mar. 22, 2024.

* cited by examiner

FRAME STRUCTURE DESIGN FOR DOWNLINK TDD-TDD CARRIER AGGREGATION WITH PUSCH-LESS CELL

RELATED APPLICATIONS

The present application is a 35 U.S.C. 371 National Phase entry of International Patent Application No. PCT/CN2021/089366, filed in China on Apr. 23, 2021, which claims priority to the earlier International Patent Application No. PCT/CN2020/087537, filed in China on Apr. 28, 2020, both of which are hereby incorporated by reference in each of their entirety.

TECHNICAL FIELD

This application relates to wireless communication systems, and more particularly to communication frame structures for TDD-TDD Carrier Aggregation.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Aggregating spectra typically involves aggregating transmission from various transmission bands, which is referred to as Carrier Aggregation (CA). The various bands are designated by uplink and downlink frequencies, duplex modes, and sub-carrier spacings (SCS) parameters, for example. It is important to optimize data transfer with systems that employ CA under various network configurations.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of operating a user equipment (UE) in communications with a base station (BS) includes performing downlink and uplink with the BS using a primary frame on a first time-division-duplexed (TDD) band of a primary component carrier (PCC), wherein the primary frame has a primary frame structure that includes a plurality of slots with one or more downlink slots, one or more uplink slots, and one or more switching slots; performing downlink with the BS using a secondary frame on a second band of a secondary component carrier (SCC), wherein the second frame has a secondary frame structure that includes a plurality of slots having one or more downlink slots, one or more uplink slots, and one or more switching slots; and sending a sounding reference signal (SRS) on the SCC, wherein the primary frame and the secondary frame form a carrier aggregation (CA) frame structure where the SRS on the secondary frame of the SCC is aligned with a downlink slot on the primary frame of the PCC.

A user equipment (UE) apparatus according to some embodiments of this disclosure includes a processor; a memory coupled to the processor, the memory including data and instructions to be executed on the processor; a frame module that stores a carrier aggregation (CA) frame structure; a communications module coupled to receive downlink and transmit uplink according to CA frame structure; a transceiver coupled to the communications module to transmit and receive according to the CA frame structure; and antennas coupled to the transceiver to transmit and receive in a first time division duplexed (TDD) band of a primary component carrier (PCC) and in a second TDD band of a secondary carrier component according to the CA frame structure, wherein the processor executes instructions to perform downlink and uplink with a base station (BS) using a primary frame on a first time-division-duplexed (TDD) band of a primary component carrier (PCC), wherein the primary frame has a primary frame structure that includes a plurality of slots with one or more downlink slots, one or more uplink slots, and one or more switching slots; perform downlink with the BS using a secondary frame on a second band of a secondary component carrier (SCC), wherein the second frame has a secondary frame structure that includes a plurality of slots having one or more downlink slots, one or more uplink slots, and one or more switching slots; and send a sounding reference signal (SRS) on the SCC, wherein the primary frame and the secondary frame form a carrier aggregation (CA) frame structure where the SRS on the secondary frame of the SCC is aligned with a downlink slot on the primary frame of the PCC.

In some embodiments according to the present disclosure, a method of operating a base station (BS) in communications with a user equipment (UE) includes performing downlink and uplink with the UE using a primary frame on a first time-division-duplexed (TDD) band of a primary component carrier (PCC), wherein the primary frame has a primary frame structure that includes a plurality of slots with one or more downlink slots, one or more uplink slots, and one or more switching slots; performing downlink with the UE using a secondary frame on a second band of a secondary component carrier (SCC), wherein the second frame has a secondary frame structure that includes a plurality of slots having one or more downlink slots, one or more uplink slots, and one or more switching slots; and receiving a sounding reference signal (SRS) on the SCC, wherein the primary frame and the secondary frame form a carrier aggregation (CA) frame structure where the SRS on the secondary frame of the SCC is aligned with a downlink slot on the primary frame of the PCC.

In some embodiments, a base station (BS) according to some embodiments of the present disclosure includes a processor; a memory coupled to the processor, the memory including data and instructions to be executed on the processor; a frame module that stores a carrier aggregation (CA) frame structure; a communications module coupled to transmit downlink and receive uplink according to CA frame structure; a transceiver coupled to the communications module to transmit and receive according to the CA frame structure; and antennas coupled to the transceiver to transmit and receive in a first time division duplexed (TDD) band of a primary component carrier (PCC) and in a second TDD band of a secondary carrier component according to the CA frame structure, wherein the processor executes instructions to perform downlink and uplink with a user equipment (UE) using a primary frame on a first time-division-duplexed (TDD) band of a primary component carrier (PCC), wherein the primary frame has a primary frame structure that includes a plurality of slots with one or more downlink slots, one or more uplink slots, and one or more switching slots, perform downlink with the UE using a secondary frame on a second band of a secondary component carrier (SCC), wherein the second frame has a secondary frame structure that includes a plurality of slots having one or more downlink slots, one or more uplink slots, and one or more switching slots, and receive a sounding reference signal (SRS) on the SCC, wherein the primary frame and the secondary frame form a carrier aggregation (CA) frame structure where the SRS on the secondary frame of the SCC is aligned with a downlink slot on the primary frame of the PCC.

Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

Figure 1:
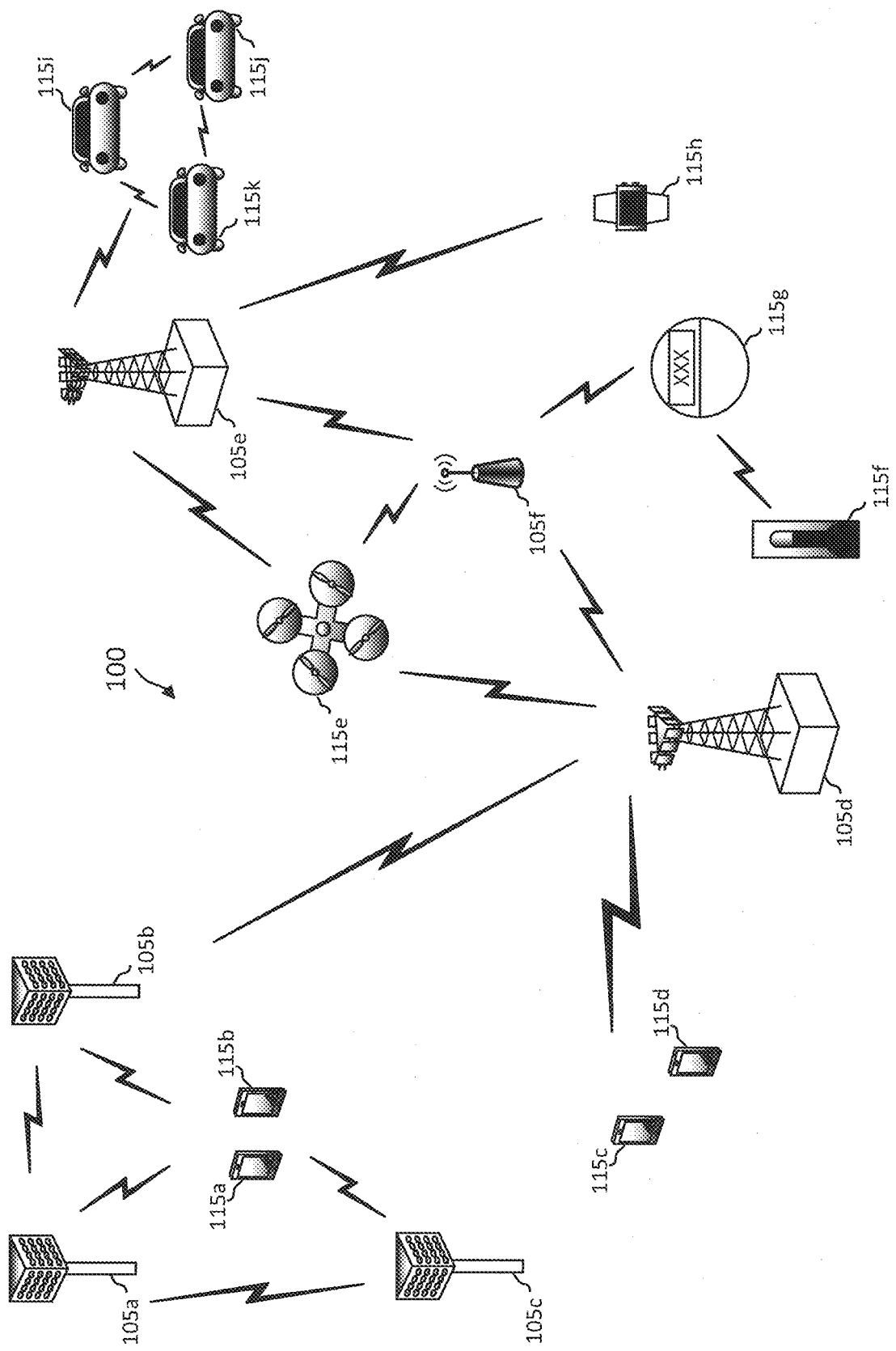
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time intervals (TTIs); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL slots to meet the current traffic needs.

Embodiments of the present disclosure relate to frame structures for primarily DL between a UE and BS using a time-division duplexing (TDD) carrier aggregation. In some embodiments, one carrier of the carrier aggregation does not include a data uplink (i.e. PUSCH-less). In particular, embodiments minimize a sounding reference signal (SRS) related carrier switching time that occurs when a first band switch with SRS and a second band switch coincide, resulting in a carrier switch retuning process.

In some embodiments, a CA frame structure includes a first frame in a first band and a second frame in a second band. Each of the first frame and the second frame includes a plurality of slots, including one or more downlink slots, one or more uplink slots, and one or more switching slots. One of the first band the second band is a secondary component carrier (SCC) and the opposite one of the first band the second band is a primary component carrier (PCC). Uplink, and downlink is performed in the PCC, which therefore includes one or more uplink slots, one or more downlink slots, and one or more switching slots. The PCC, therefore, carries control data. In some embodiments, the SCC is capable of downlink only and only allows upload of a SRS. The SCC frame structure therefore also includes downlink slots, uplink slots, and switching slots where the uplink slots are not used for uplink.

In some embodiments, if the frame structure of the first frame is known, the frame structure of the second frame is derived by splitting the frame structure of the first frame into a first section and a second section and, forming the second frame by switching the order of the first section and the second section. This results in the SRS signal coinciding with a downlink slot in the other carrier and not a switching slot. Another embodiment that results in the SRS signal in the SCC coinciding with a downlink slot is to time shift the second frame from the first frame so that the SRS signal in the SCC coincides with a downlink slot. In further embodiments, the first frame structure and the second frame structure are arranged such that at least one uplink slot in the PCC corresponds with a downlink slot in the SCC.

Various aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

ABS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105$d$ and 105$e$ may be regular macro BSs, while the BSs 105$a$-105$c$ may be macro BSs enabled with one of three dimension (3D), full dimension (FD), or massive MIMO. The BSs 105$a$-105$c$ may take advantage of their higher dimension MIMO capabilities to exploit 3D beamforming in both elevation and azimuth beamforming to increase coverage and capacity. The BS 105$f$ may be a small cell BS which may be a home node or portable access point. ABS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115$a$-115$d$ are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115$e$-115$k$ are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, or desired transmission between BSs, and backhaul transmissions between BSs.

In operation, the BSs 105$a$-105$c$ may serve the UEs 115$a$ and 115$b$ using 3D beamforming and coordinated spatial techniques, such as coordinated multipoint (CoMP) or multi-connectivity. The macro BS 105$d$ may perform backhaul communications with the BSs 105$a$-105$c$, as well as with the small cell, the BS 105$f$. The macro BS 105$d$ may also transmit multicast services which are subscribed to and received by the UEs 115$c$ and 115$d$. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115$e$, which may be a drone. Redundant communication links with the UE 115$e$ may include links from the macro BSs 105$d$ and 105$e$, as well as links from the small cell BS 105$f$. Other machine type devices, such as the UE 115$f$ (e.g., a thermometer), the UE 115$g$ (e.g., smart meter), and UE 115$h$ (e.g., wearable device) may communicate through the network 100 either directly with BSs, such as the small cell BS 105$f$, and the macro BS 105$e$, or in multi-hop configurations by communicating with another user device which relays its information to the network, such as the UE 115$f$ communicating temperature measurement information to the smart meter, the UE 115$g$, which is then reported to the network through the small cell BS 105$f$. The network 100 may also provide additional network efficiency through dynamic, low-latency TDD/FDD communications, such as in a vehicle-to-vehicle (V2V).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

Figure 2:
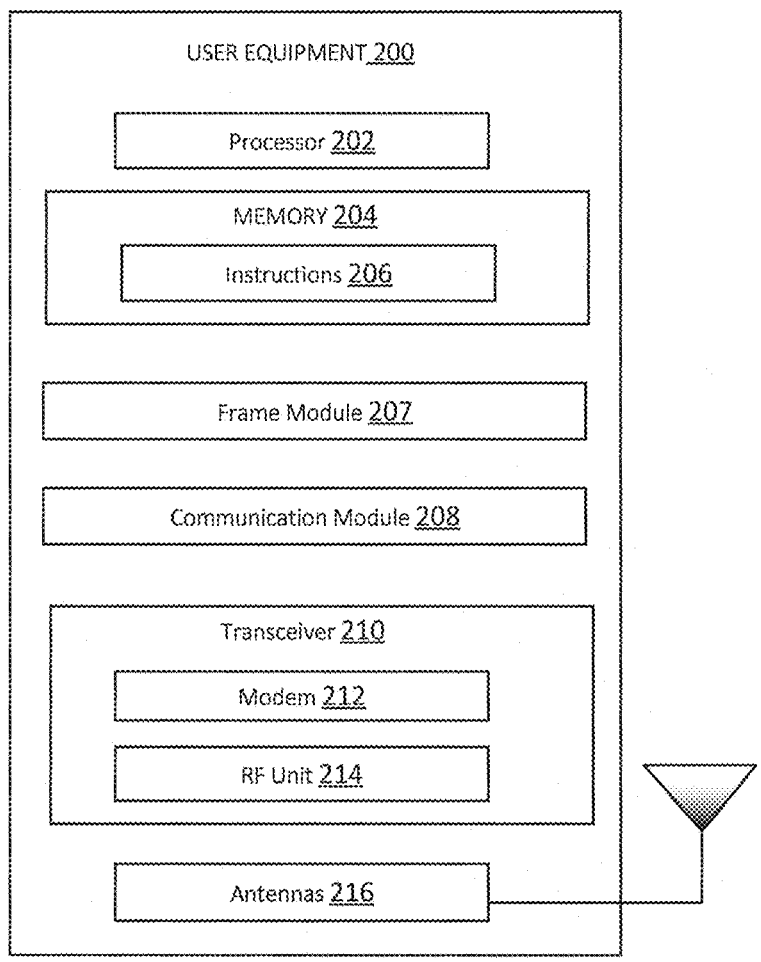
FIG. 2 is a block diagram of an example user equipment (UE) according to embodiments of the present disclosure.

FIG. 2 is a block diagram of an example UE 200 according to embodiments of the present disclosure. The UE 200 may be a UE 115 as discussed above. As shown, the UE 200 may include a processor 202, a memory 204, a frame module 207, a communication module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure. The instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the frame module 207 and the communication module 208 may be implemented via hardware, software, or combinations thereof. For example, each of the frame module 207 and the communication module 202 may be implemented as a processor, circuit, and/or instructions 206 stored in the memory 204 and executed by the processor 202.

The frame module 207 may be configured to package uplink (UL) data within a predetermined frame structure or receive downlink (DL) data. The predetermined frame structure is set to transmit and receive data through network 100. The communication module 208 may be configured to transmit and receive data between UE 200 and a BS according to the predetermined frame structure. The predetermined frame structure can be a time division duplexing (TDD) or frequency division duplexing (FDD) structure and includes slots for uplink and downlink.

As shown, the transceiver 210 may include the modem subsystem 212 and the RF unit 214. The transceiver 210 can be configured to communicate bi-directionally with other devices, such as the BSs 105 and/or another core network element. The modem subsystem 212 may be configured to modulate and/or encode the data from the memory 204 and/or the communication module 208 according to a modulation and coding scheme (MCS), e.g., a low-density parity check (LDPC) coding scheme, a turbo coding scheme, a convolutional coding scheme, a digital beamforming scheme, etc., and in accordance with the predetermined frame structure. The RF unit 214 may be configured to process (e.g., perform analog to digital conversion or digital to analog conversion, etc.) modulated/encoded data from the modem subsystem 212 (on outbound transmissions) or of transmissions originating from another source such as a UE or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 200 to enable the UE 200 to communicate with other devices.

The RF unit 214 may provide the modulated and/or processed data, e.g. data packets (or, more generally, data messages that may contain one or more data packets and other information), to the antennas 216 for transmission to one or more other devices. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
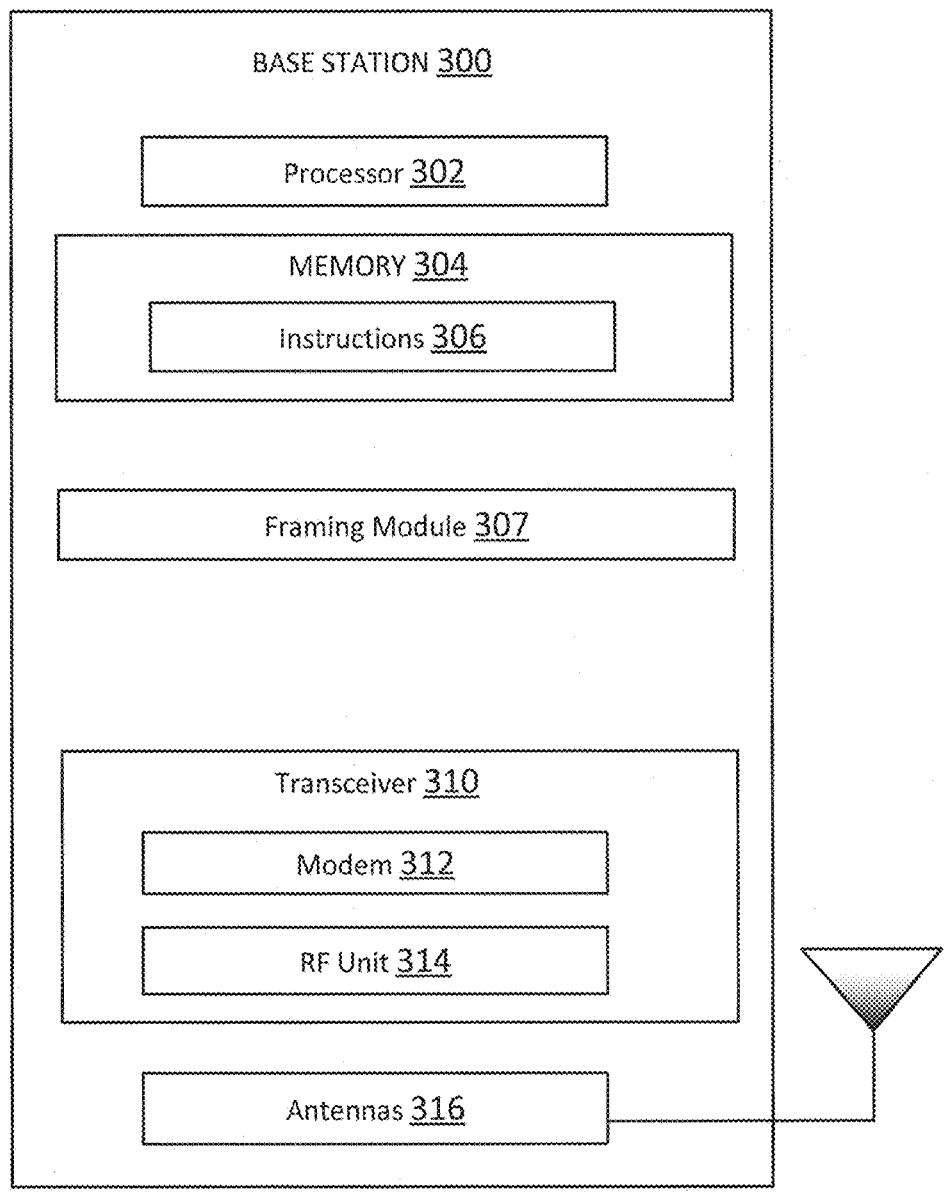
FIG. 3 is a block diagram of an example base station (BS) according to embodiments of the present disclosure.

FIG. 3 is a block diagram of an example BS 300 according to embodiments of the present disclosure. The BS 300 may be a BS 105 as discussed above. As shown, the BS 300 may include a processor 302, a memory 304, a frame module 307, a communication module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein. The instructions 306 may also be referred to as code, which may be interpreted broadly to include any type of computer-readable statement(s) as discussed above with respect to FIG. 2.

Each of the frame module 307 and the communication module 308 may be implemented via hardware, software, or combinations thereof. For example, each of the frame module 307 and the communication module 308 may be implemented as a processor, circuit, and/or instructions 306 stored in the memory 304 and executed by the processor 302.

The frame module 307 may be configured to prepare or receive data into a predetermined frame structure or retrieve data according to a predetermined frame structure in order to send and receive data. The predetermined frame structure can be a time division duplexing (TDD) or frequency division duplexing (FDD) structure and includes slots for uplink and downlink.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or another BS. The RF unit 314 may be further configured to perform analog beamforming in conjunction with the digital beamforming. Although shown as integrated together in transceiver 310, the modem subsystem 312 and/or the RF unit 314 may be separate devices that are coupled together at the BS 300 to enable the BS 300 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of information to complete attachment to a network and communication with a camped UE 115 or 200 according to embodiments of the present disclosure. The antennas 316 may further receive data messages transmitted from other devices and provide the received data messages for processing and/or demodulation at the transceiver 310. The antennas 316 may include multiple antennas of similar or different designs in order to sustain multiple transmission links.

In an embodiment, the BSs 105 can assign or schedule transmission resources (e.g., in the form of time-frequency resource blocks (RB)) for DL and UL in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, 10 slots per frame. Each slot may be further divided into mini-slots. In a FDD mode, simultaneous UL and DL may occur in different frequency bands. For example, each subframe includes an UL subframe in an UL frequency band and a DL subframe in a DL frequency band. In a TDD mode, UL and DL occur at different time periods using the same frequency band. For example, a subset of the slots (e.g., DL slots) in a radio frame may be used for DL and another subset of the slots (e.g., UL slots) in the radio frame may be used for UL.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a physical DL control channel (PDCCH). The BS 105 may transmit a DL communication signal to the UE 115 via a physical DL shared channel (PDSCH) according to a DL scheduling grant. The UE 115 may transmit an UL communication signal to the BS 105 via a physical UL shared channel (PUSCH) and/or physical UL control channel (PUCCH) according to an UL scheduling grant.

Frame structures for various transmission bands can be defined for communication between UE 115 and BS 105. In particular, NR standards define operating bands within specified frequency ranges. For example, within the frequency range of 450 MHz-6000 MHz (FR1), NR defines a series of operating bands that operate in FDD mode (N1, N2, N3, N4, N7, 8, N12, N20, N25, N28, N70, N71), TDD mode (N34, N38, N39, N40, N41, N51, N77, N78, N79), supplemental downlink mode SDL (N75, N76), or supplemental uplink mode SUL (N80, N81, N82, N83, N84, and N86). Within the frequency range of 24250 MHz-526500 MHz, several TDD mode bands are defined (N257, N258, N260, and N261). A transmission implementation will define a particular operating band or set of operating bands for communications between UE 115 and a BS 105. Furthermore, particular frame structures are adopted to provide for UL and DL functionality with respect to the adopted operating band.

For example, the operating band N41 refers to an operating band with both uplink and downlink operating between 2490 MHz and 2690 MHz with a time division duplexing (TDD) mode. N41 can have sub-carrier spacing (SCS) of 15, 30, and 60 kHz. The TDD N78 band refers to operating with uplink and downlink operations operating between 3300 MHz and 3800 MHz and SCS of 15, 30, and 60 kHz. In the N79 band, both uplinks and downlinks operate between 3300 MHz and 3800 MHz with a TDD mode and SCS of 15, 30, and 60 kHz. Other band structures may be used in certain applications. One skilled in the art will recognize that embodiments according to this disclosure can include various definition of transmission bands. These bands may, for example, be specifically defined for particular applications.

Figure 4A:
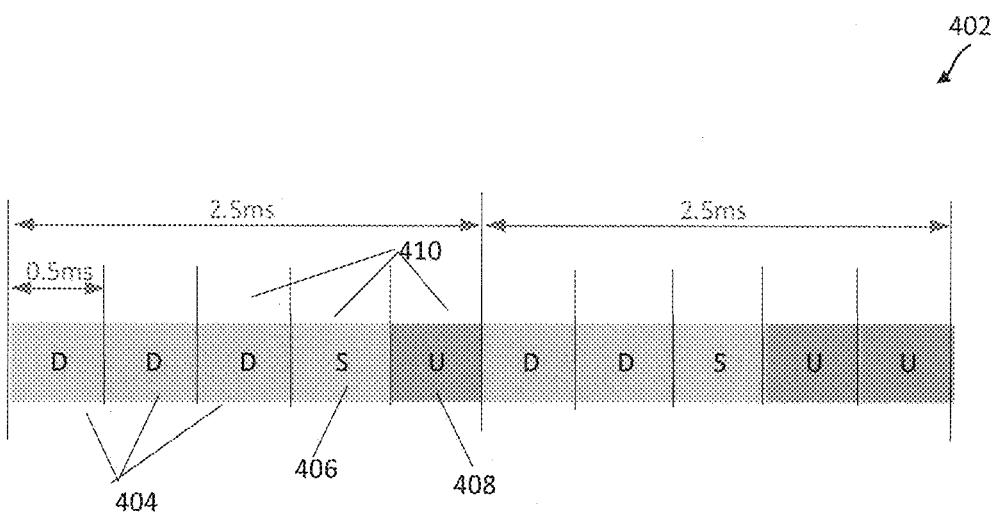
FIGS. 4A and 4B illustrate example frame structures for N41 and N78 communications bands, respectively, that are currently in use.
Figure 4B:
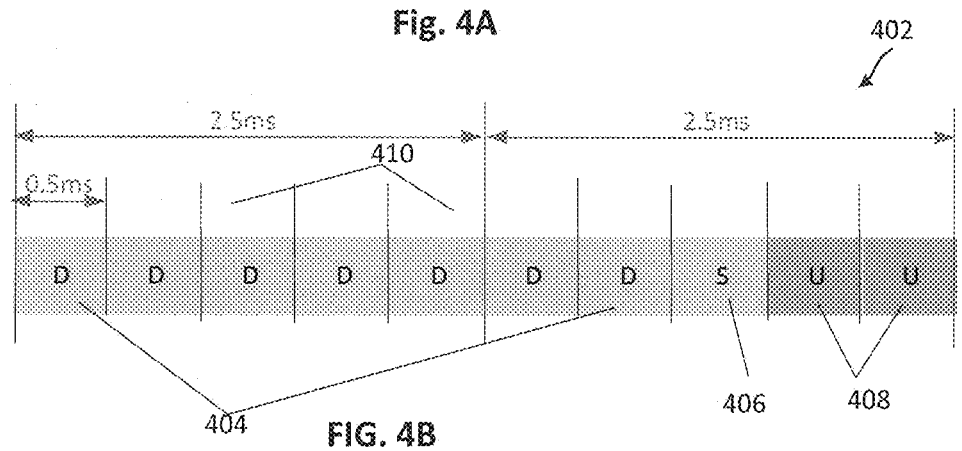

As illustrated in FIGS. 4A and 4B, TDD frame 402 is formed as a series of slots 410 that are of a particular time duration T. Each slot 410 is designated as a downlink slot (D) 404, an uplink slot (U) 408, or a switching slot (S). BS 105 downloads data to UE 115 in downlink slots 404. UE 115 uploads data to BS 105 in uplink slots 408. Switching slots S 408 occurs to switch between a downlink slot 404 and an uplink slot 408.

As a particular example, China Telecom/China Unicom has instituted the TDD N78 operating band with a 30 KHz sub-carrier spacing (SCS). The N78 operating band defined as an operating band between 3300 MHz and 3800 MHz for both UL and DL operation, operating in TDD mode. The frame structure 402 for an N78 operating band specifically operating at 3500 MHz (3.5 GHz) is illustrated in FIG. 4A. Frame 402 then includes 10 slots defining a 2.5 ms dual cycle frame defined as "DDDSUDDSUU," where "D" designates a downlink slot, S represents a switching slot, and U represents an uplink slot. As illustrated in FIG. 4A, the time duration T of each slot for the particular application defined is 0.5 ms, resulting in a half frame (5 slots) of 2.5 ms duration, and a full frame of 5 ms duration.

As another particular example, China Mobile Communications Corporation (CMCC) uses the TDD N41 band operating at 2600 MHz (2.6 GHz) and a 30 kHz SCS, which also results in a frame 402 having 10 slots 410, each of 0.5 ms duration. As a result, a 5 ms single cycle DDDDDDD-SUU frame structure can be defined.

In order to increase bandwidth, carrier aggregation can be used. Carrier aggregation refers to combining transmission in two or more bands. Transmission may be TDD, FDD, or a mix. In carrier aggregation, a primary component carrier (PCC) is complemented with one or more secondary component carriers (SCCs). The distinguishing feature between a PCC and the SCCs is that the control signals are handled through the PCC while SCCs are used to increase data throughput. Consequently, the PCC and SCCs, operating in different transmission bands, can be used to increase the transmission through-put between a UE 115 and a BS 105. In this disclosure concentration on aggregation of two TDD transmission bands (a PCC in combination with one SCC) is presented, although one skilled in the art may understand that multiple SCCs may be used.

For example, the N41 band can be aggregated with other bands such as the N78 or N79 bands to facilitate carrier aggregated communications between UE 115 and BS 105. Other combinations of operating bands can also be aggregated, depending on their compatibilities. Although particular band designations are discussed in this disclosure as examples, they should not be considered limiting. Embodiments of the present disclosure include aggregation of a first band and a second band. The first band and the second band, one of which is the PCC and one is the SCC, are TDD bands separated in operating frequency. One skilled in the art will recognize that aspects of these embodiments may be implemented with CA configurations with more than one SCC.

Figure 5A:
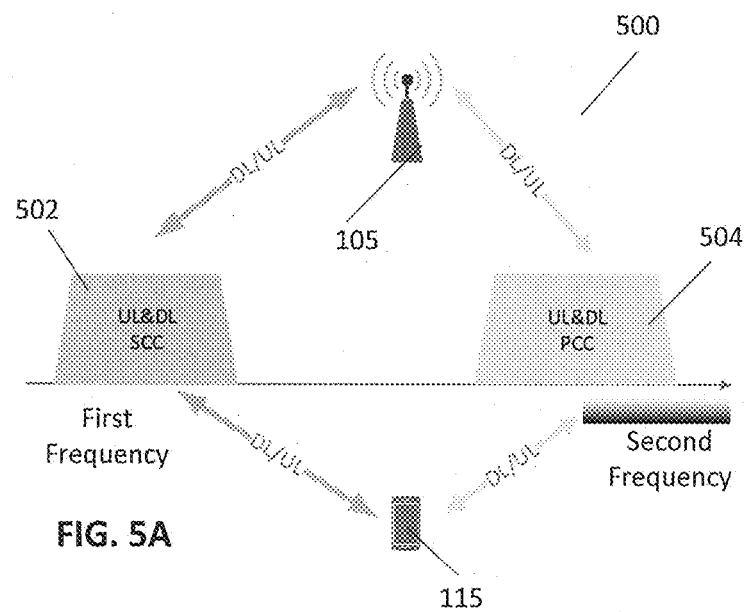
FIG. 5A illustrates communication with carrier aggregation (CA) for performing uplink and downlink between a UE and a BS.

FIG. 5A illustrates a CA arrangement 500 for transmission of data between UE 115 and BS 105. As illustrated in FIG. 5A, PCC 504 at a second frequency is a transmission channel with both uplink (UL) and downlink (DL) capability. SCC 502 at a first frequency is also a transmission channel with both UL and DL capability. As is illustrated, PCC 504 is at a second frequency while SCC 502 is at a first frequency. First frequency and second frequency designate two separated frequency bands. In some examples, the first frequency of SCC 502 may be at a lower frequency band than the second frequency of PCC 504. However, in some cases the bands may be switched so that the second frequency of PCC 504 is at a frequency band that is lower frequency than the first frequency of SCC 502. In this disclosure PCC 504 may be referred to as the primary cell or Pcell. Additionally, SCC 502 may be referred to as the secondary cell or Scell.

Figure 5B:
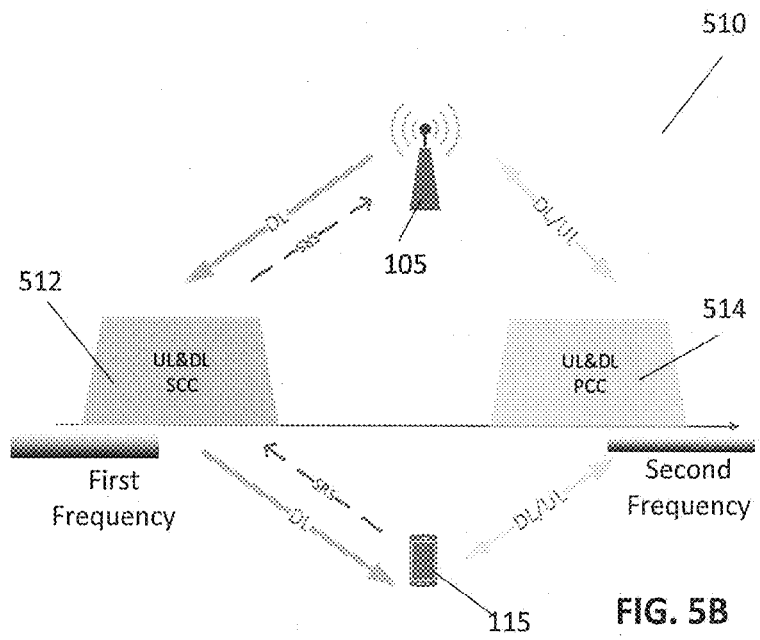
FIG. 5B illustrates communication with CA for uplink and downlink where one of the bands defines a PUSCH-less cell that cannot be used for uplink data.

FIG. 5B illustrates a carrier aggregation configuration 510 that includes a PUSCH-less cell. As illustrated in FIG. 5B, UE 115 and BS 105 communicate using a PCC 514 and a SCC 512. PCC 514 includes both UL and DL capability. SCC 512, however, only includes DL capability, which defines SCC 512 as a PUSCH-less cell. Only sounding reference signal (SRS) switching is performed through the TDD SCC 512 PUSCH-less cell.

In TDD, SRS switching is performed after one or more DL subframes in the frame structure have been completed. SRS is asserted by UE 115 to start carrier tuning of the carrier channel. The SRS itself is used to analyze the channel of the band and may be sent in a switching subframe in either PCC 514 or SCC 512. The resulting analysis and carrier tuning procedure, however, occupies some time, possibly several subframes of the frame substructure.

Figure 6A:
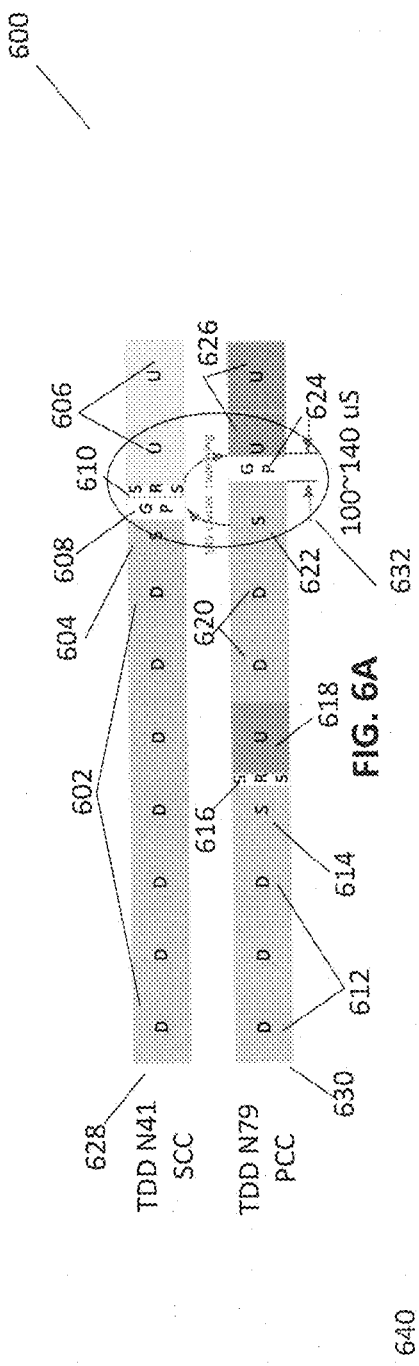
FIGS. 6A and 6B illustrates frame structures with CA in the PUSCH-less cell communication as illustrated in FIG. 5B.
Figure 6B:
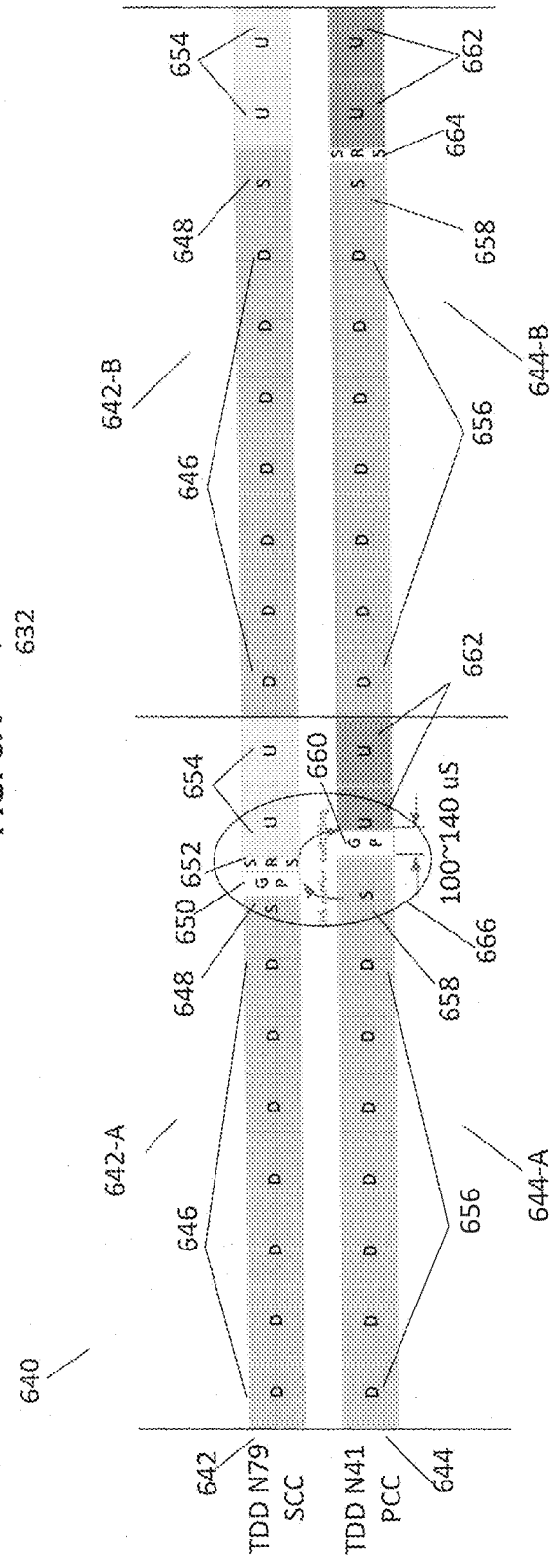

FIGS. 6A and 6B illustrate aspects of frame structures used in the PUSCH-less cell configuration 510 illustrated in FIG. 5B. As illustrated in FIG. 6A, frame structure 600 includes frames 628 and 630. In the specific example illustrated in FIG. 6A, frame 628 is a TDD N41 band frame on SCC 512. Frame 630 in this example is a TDD N79 frame on PCC 514. Consequently, in this example, the higher frequency band (N79) is the primary cell PCC 514 while the low frequency band (N41) is the secondary cell SCC 512. As such, no PUSCH/PUCCH uplinks are provided on frame 628, which supports only downlinks, while PUSCH/PCCH communications is supported on frame 630, which supports both downlinks and uplinks.

As illustrated in FIG. 6A, the ten (10)-slot structure of frame 628 is DDDDDDDSUU, as was illustrated above in FIG. 4B. As such, slots 602 are each downlink slots (designated "D" in FIG. 6A). As is illustrated, the first seven (7) slots includes downlink slots 602. The last downlink slot 602 is followed by a switching slot 604. The last two slots are blanking UL slots 606. Blanking UL slots 606 provide switching time, but no uplink capability. As is further illustrated in FIG. 6A, a carrier switching 632 starts in switching slot 604 and results in a switching gap 608 and transmission from UE 115 of SRS 610, which occupies part of switch slot 604 and part of the first blanking uplink slot 606. A switching gap 608 also spans switching slot 604 and part of the first of blanking uplink slot 606. During that time, the carrier is retuned as discussed above.

As discussed above, in the example illustrated in FIG. 6A, the primary cell PCC 514 is an N79 band, which will have the same frame structure and timing as the previously discussed N78 band shown in FIG. 4A. As shown in FIG. 6A, the structure of frame 630 is DDDSUDDSUU. In this case, frame 630 starts with three (3) downlink slots 612 in which data can be downloaded from BS 105 to UE 115. Following downlink slots 612, a switching slot 614 separates downlink slots 612 from uplink slot 618. In uplink slot 618, UE 115 can upload data to BS 105. Uplink slot 618 is then followed by two further downlink slots 620. A second switching slot 622 is then followed by two uplink slots 626. As is illustrated, an SRS 616 can be transmitted during switching slot 614. SRS 616 as illustrated does not result in a gap time during which carrier tuning is performed.

However, switching slot 622 of frame 630 in PCC 514 overlaps with switching slot 608 of frame 628 in SCC 512, where SRS 610 is sent by UE 115 and forms a carrier switching 632. In carrier switching 632, SRS 610 results in a throughput loss indicated by carrier switching gap 624 in frame 630. Switching gap 624 occurs during the first uplink slot 626 and results in the loss of uplink capability, corresponding with the SRS 610. In particular, switching gap 624 can be from 100 to 140 µs during which time carrier tuning may be accomplished according to the typical capability of UE 115. Switching gap 624 can result in the lost transmission of a number (e.g., around 5) of symbols that cannot be scheduled for PUSCH/PUCCH immediately following an SRS switching 610 in switching slot 604.

FIG. 6B illustrates another example frame structure 640. Frame structure 640 includes frame 642 of a TDD N79 band on secondary cell SCC 512 and a frame 644 of a TDD N41 band on primary cell PCC 514. Consequently, in this example, the low frequency band (N41) is the primary cell while the high frequency band (N79) is the secondary cell. FIG. 6B illustrates frame structure 642 as two ten (10)-slot concatenated frames, frames 642-A and 642-B, for clarity. FIG. 6B further illustrates frame structure 644 as two ten (10)-slot concatenated frames, frames 644-A and 644-B, for clarity.

As illustrated in FIG. 6B, frame 642 is formed with concatenated frames 642-A and 642-B. Each of frames 642-A and 642-B has ten (10) slots that include, in order, seven (7) downlink slots 646, followed by a switching lot 648 and two blanking uplink slots 654. As is illustrated, the switching slot 648 in frame 642-A includes a gap 650 and SRS 652 (DDDDDDDSUU). The switching slot 648 in frame 642-B does not include an SRS.

As is further illustrate, frame 644 is formed with concatenated frames 644-A and 644-B. Each of frames 644-A and 644-B have 10-slots that include seven (7) downlink slots 656, a switching slot 658, and two uplink slots 662

(DDDDDDDSUU). As is illustrated, switching slot 658 of frame 644-A is aligned with switching slot 648 of frame 642-A, which includes gap 650 and SRS 652. Consequently, in carrier switching 666, switching gap 660 is formed in the first uplink slot 660 following the switching slot 658, resulting in a transmission loss of between 100 and 140 μs. Consequently, as discussed above, a number of symbols (e.g., around 5) cannot be scheduled for PUSCH/PUCCH immediately following an SRS switching 652. As is further illustrated in FIG. 6B, an SRS 664 can be sent in switching slot 658 in frame 644-B. SRS 664, however, does not result in appreciably throughput loss.

The throughput loss that is illustrated in carrier switching 632 of FIG. 6A and carrier switching 666 in FIG. 6B can be avoided by providing frame structures where an SRS on SCC 512 does not overlap with a switching slot on PCC 514. This arrangement can occur in several ways, as is described in further detail below. In one embodiment, the frame structure on SCC 512 and the frame structure on PCC 514 can be arranged to prevent an SRS on SCC 512 to overlap with a switching slot on PCC 514. In a second embodiment, a time delay can be introduced between the frame structure on SCC 512 and the frame structure on PCC 514. In the second embodiment, the time delay is arranged such that the frame structures are time-shifted, but slots remain aligned.

In further embodiments according to the present disclosure, the frame structure on SCC 512 and the frame structure on PCC 514 are arranged such that uplink slots in the PCC 514 are aligned with downlink slots in the SCC 512. This arrangement prevents collisions between uplink slots across carriers of the carrier aggregation.

Figure 7A:
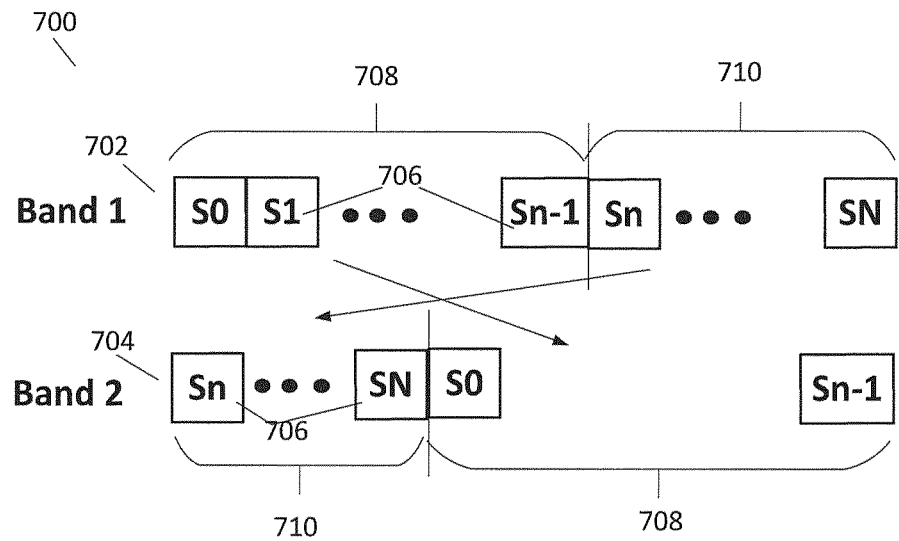
FIGS. 7A, 7B, 7C, and 7D illustrate examples of defining frame structures according to some embodiments.

FIG. 7A illustrates a CA frame structure 700 for a TDD-TDD carrier aggregated PUSCH-less cell arrangement for data transmission between a UE 115 and BS 105 according to some embodiments. As illustrated in FIG. 7A, CA frame structure 700 is carrier aggregated frame 702 operating in a first band and frame 704 operating in a second band. As illustrated in FIG. 7A, frame 702 is formed by N+1 sequential slots 706, each of which have time duration T, that are labeled S0 through SN. In many applications, N+1 is ten (10) slots. As is discussed above, slots 706 include slots designated as downlink slots (D), uplink slots (U), and switching slots (S). The switching slots (S) may include one or more SRS signals.

The frame structure of frame 704 is derived from the frame structure of frame 702. As illustrated in FIG. 7A, frame 702 is partitioned into a first section 708 and a second section 710. First section 708 includes slots $S_0$ through $S_{n-1}$ and second section 710 includes slots $S_n$ through $S_N$. As discussed above, N+1 is the total number of slots in a frame. The parameter n can be a value from 1 to N−1. From 704 is then defined by switching first section 708 with second section 710 so that the order of slots 706 becomes $S_n$ through $S_N$ and then $S_0$ through $S_{n-1}$.

Figure 7B:
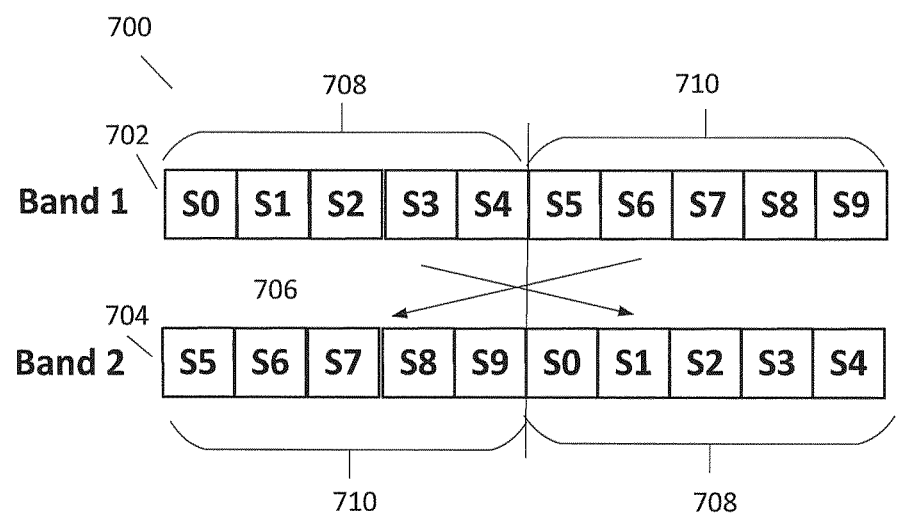

FIG. 7B illustrates an example frame structure 700 where n is (N+1)/2. The specific example illustrated is where N+1 is 10 so that n=5 and first section 708 includes slots $S_0$ through $S_4$ and second section 710 includes slots $S_5$ through $S_9$. FIG. 7B illustrates an example with the frame structure of frame 702 is split in half and the two halves switched to form the frame structure of frame 704.

Figure 7C:
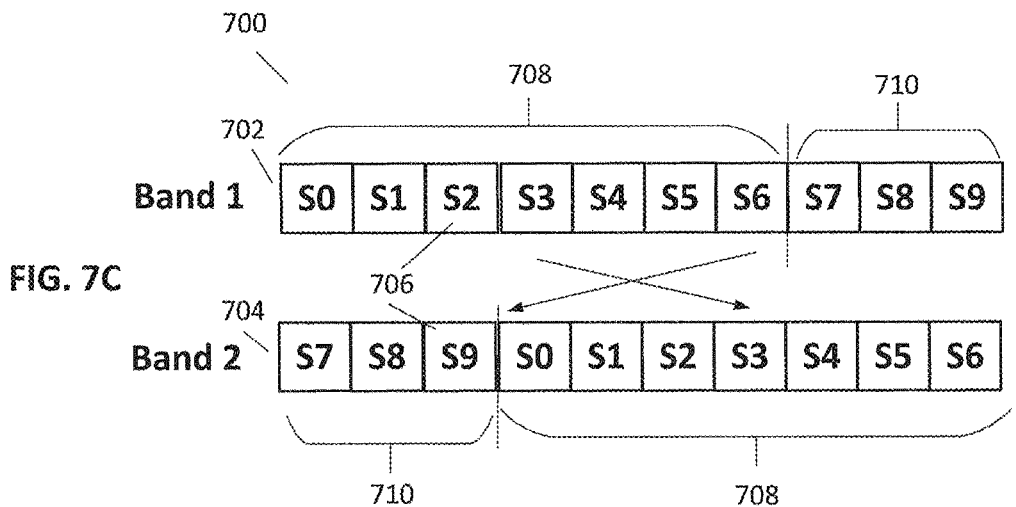

FIG. 7C illustrates another example frame structure formed according to some embodiments. As illustrated in FIG. 7C, N+1 is ten (10) resulting with a frame 702 with 10 slots 706. In this particular example, n is N−2, or seven (7). Consequently, first section 708 includes slots $S_0$ through $S_6$ while second section 710 includes slots $S_7$ through $S_9$. Therefore frame 704 derived from frame 702, formed by switching first section 708 with second section 710, is, in order, slots $S_7$ through $S_9$ followed by slots $S_0$ through $S_6$. In some embodiments, division of slots into first section 708 and second section 710 is arranged such that the resulting CA frame structure 700 includes non-overlapping carrier switching slots to avoid transmitting an SRS in the SCC in conflict with a switching slot in the PCC. Further, the division of slots into first section 708 and second section 710 can be arranged such that the resulting CA frame structure 700 aligns uplink slots in the PCC with downlink slots in the SCC to avoid conflicts between uplink slots.

Figure 7D:
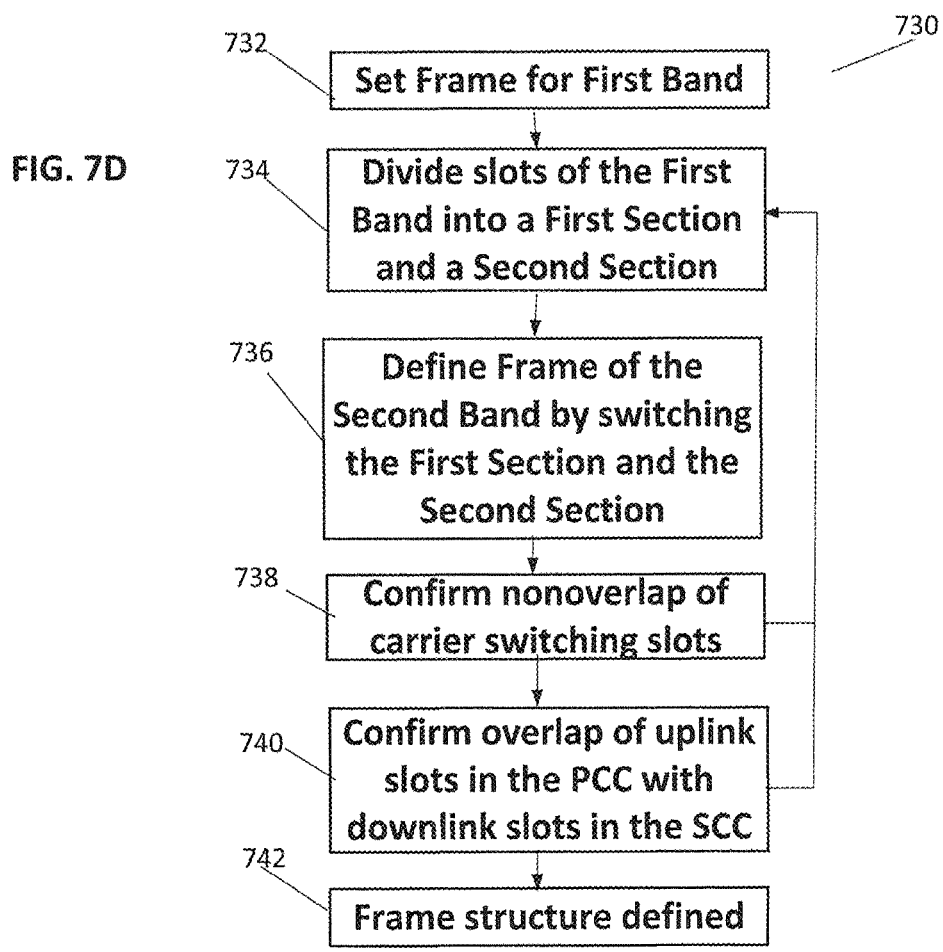

FIG. 7D illustrates a procedure 730 for forming frame structure 700. As illustrated in FIG. 7D, the first band frame 702 is provided. It should be noted at this point that the first band 702 may be associated with SCC 512 or with PCC 514 without loss of generality. In step 734, the frame structure 702 is divided into a first section and a second section. The first section and the second section may, in some cases, have the same number of slots or they may have a different number of slots. Each of the first section and the second section includes at least one slot. In step 736, the frame structure of frame 704 in band 2 is defined by switching the order of the first section and the second section. In step 738, it may be confirmed that a switching slot with SRS on the band associated with SCC 512 does not overlap with a switching slot on the band associated with PCC 514. In some cases, from step 738, the procedure may return to step 734 if this condition is not met.

In some embodiments, in step 740 it may be confirmed that uplink slots in the PCC are aligned with downlink slots in the SCC. Again, if this condition is not met, process 730 may return to step 734 to redefine the division of the first section and the second section. Once frame structure 700 is set, process 730 process to step 742 where CA frame structure 700 can be used for communication between UE 115 and BS 105.

Figure 8A:
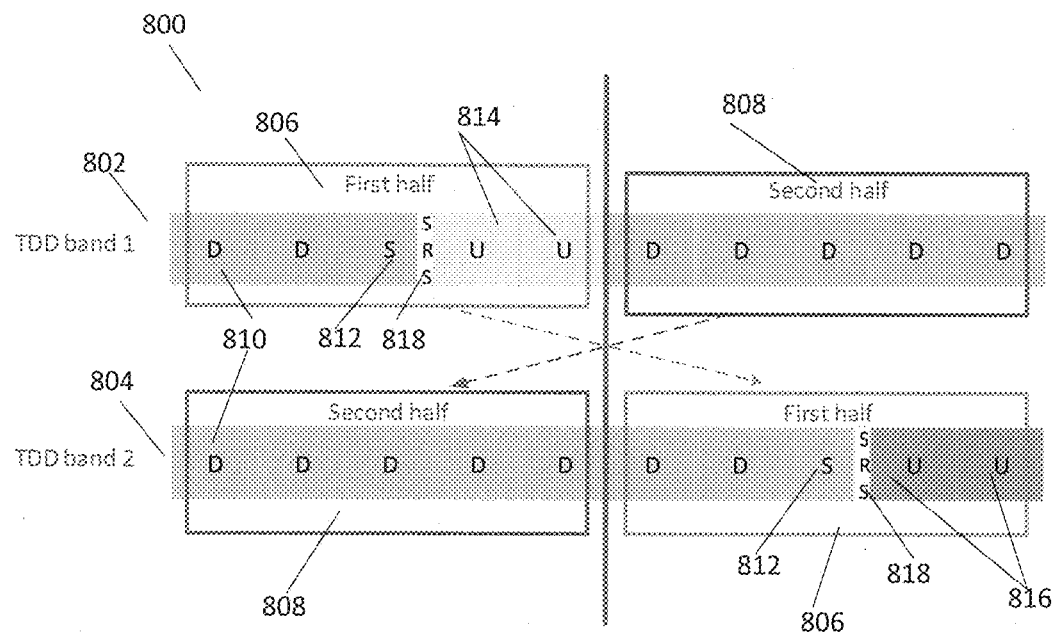
FIGS. 8A, 8B, 8C, and 8D illustrate specific examples of frame structures according to some embodiments.

FIGS. 8A through 8D illustrate some specific examples of CA frame structures defined according to this disclosure. FIG. 8A illustrates a CA frame structure 800 defined according to some embodiments. CA frame structure 800 includes frame 802 with frame structure DDSUUDDDDD. As such, frame structure 802 includes two downlink slots 810 followed by a switching slot 812 with SRS 818. Switching slot 812 is followed by two uplink slots 814 and five downlink slots 810. In the example of FIG. 8A, frame 802 is associated with band 1 in an SCC 512 so that uplink slots 814 are blanking uplink slots. As is illustrated, frame 802 is evenly split into first section 806 that includes the first half of the slots and second section 808 that includes the other half of the slots. Consequently, the frame structure of frame 804, formed by switching first section 806 and second section 808, is then DDDDDDDSUU. In this example, because frame 804 is associated with PCC 514, uplink slots 816 are capable of carrying data. As is illustrated in FIG. 8A, switching slot 812 and SRS 818 now align with a downlink slot 810. Further, uplink slots 816 in frame 804 align with downlink slots 810 in frame 802.

Figure 8B:
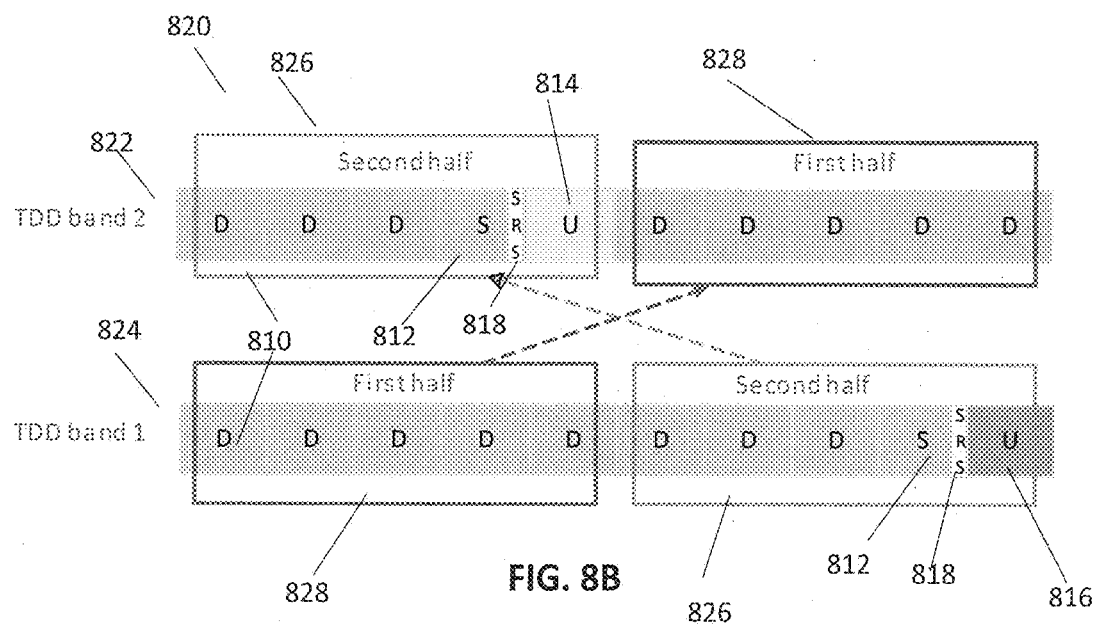

FIG. 8B illustrates another example CA frame structure 820. Frame structure 820 includes frame 822, which in the example illustrated is DDDSUDDDDD. In other words, frame 822 includes three downlink slots 810 followed by a switching slot 812 with SRS 818, followed by an uplink slot 814 and five downlink slots 810. As illustrated, the frame structure of frame 822 is separated into two equal portions with first section 826 including the first five slots DDDSU and second section 828 included the last five slots DDDDD.

Frame 824 is then derived by switching the first section 826 and the second section 828, resulting in the frame structure of frame 824 being DDDDDDDDSU. As illustrated in the example of FIG. 8B, one of frame 822 or frame 824 is associated with SCC 512 while the other is associated with PCC 514. If frame 822 is associated with SCC 512, then uplink slot 814 is a blanking uplink slot while uplink slot 816 can carry data. As is illustrated, switching slot 812 with SRS 818 aligns with downlink slots 810 in frame 824 and uplink slot 816 in frame 824 aligns with a downlink slot 810 in frame 822.

Figure 8C:
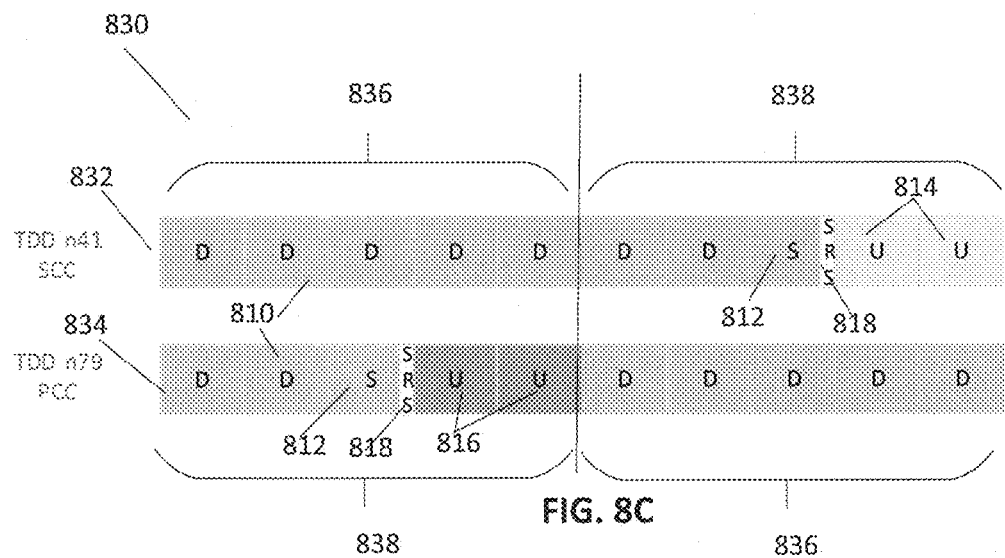

FIG. 8C illustrates another example CA frame structure 830. In this example, frame structure 830 includes frame 832, which is associated with the TDD N41 band designated as SCC 512, and frame 834, which is associated with the TDD N79 band designated as PCC 514. As illustrated, the frame structure of frame 832 is DDDDDDDSUU. As illustrated in FIG. 8C, frame 832 includes seven downlink slots 810 followed by a switching slot 812 and two blanking uplink slots 814. Switching slot 812 includes an SRS 818. As illustrated, the frame structure is split evenly between first section 836, which includes the first five downlink slots 810, and second section 838, which includes the remaining slots DDSUU. Frame 834 is then derived by switching first section 836 with second section 838, to form the frame structure DDSUUDDDDD. Uplink slots 816 in frame 834 can be used to transmit data. As is illustrated, switching slot 812 is not aligned with another switching slot so that SRS 818 in frame 832 is not transmitted during a switching slot in frame 834. Further, uplink slots 816 in frame 834 are arranged to be aligned with downlink slots in frame 830 to avoid conflicts between uplink slots.

Figure 8D:
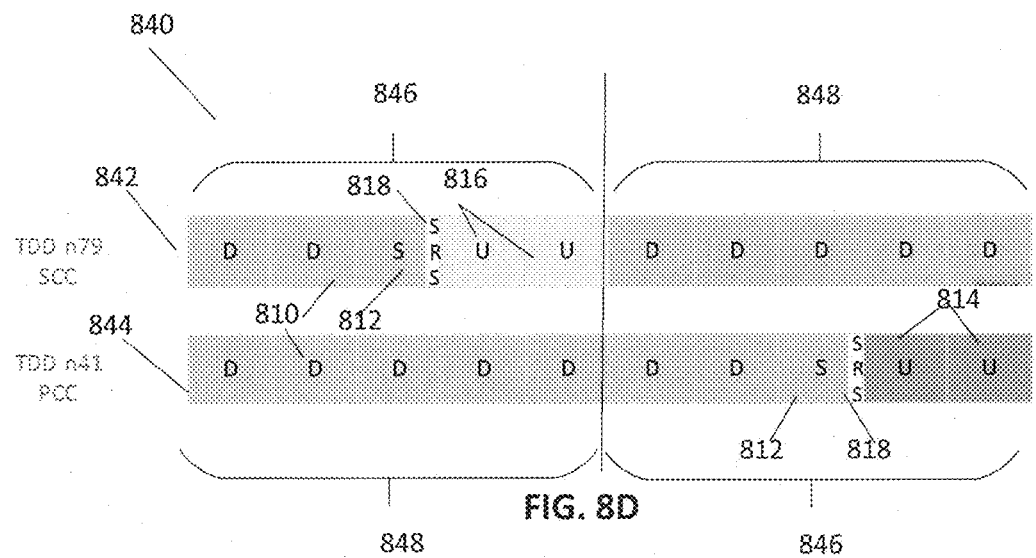

FIG. 8D illustrates another specific example CA frame structure 840. Frame structure 840 includes frames 842 and 844. Opposite of that shown in FIG. 8C, frame 842 is for the TDD N79 band as SCC 512 and frame 844 is for the TDD N41 band as PCC 514. As such, the frame structure of frame 842 is DDSUUDDDDD, where the first two slots are downlink slots 810, followed by a switching slot 812 with SRS 818, followed by two blanking uplink slots 816 and five downlink slots 810. As is illustrates, the frame structure is evenly split so that first section 846 includes the first five slots, DDSUU, and second section 848 includes 5 downlink slots DDDDD. The frame structure of frame 844 is then derived from that of frame 842 by switching first section 846 with second section 848. In that case, the frame structure of frame 844 is then DDDDDDDSUU, where uplink slots 814 now can carry data. As is illustrated, frames 842 and 844 are arranged such that switching slot 812 with SRS 818 does not align with another switching slot. Further, uplink slots 814 in frame 844 are arranged to align with downlink slots 810 of frame 842.

FIGS. 8A through 8D illustrates specific examples of deriving a CA frame structure from a first frame in a first band. In particular, the second frame in the second band is derived from the frame structure of the first band. The first band can be associated with SCC 512 or it can be associated with PCC 514. In many cases, the derivation involves dividing the frame structure of the first frame into a first section and a second section and defining the frame structure of the second band by switching the first section and the second section of the first band. As discussed above, the resulting CA frame structure is arranged such that a switching slot in the SCC is not aligned with a switching slot in the PCC. Further, in some embodiments it is arranged such that uplink slots in the PCC frame are aligned with downlink slots in the SCC frame.

Figure 9A:
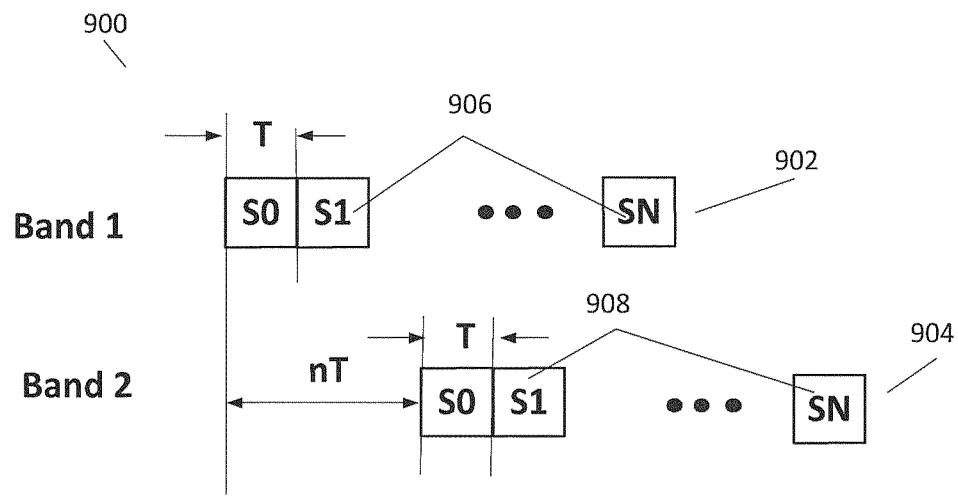
FIGS. 9A and 9B illustrate examples of defining frame structures according to some embodiments.
Figure 9B:
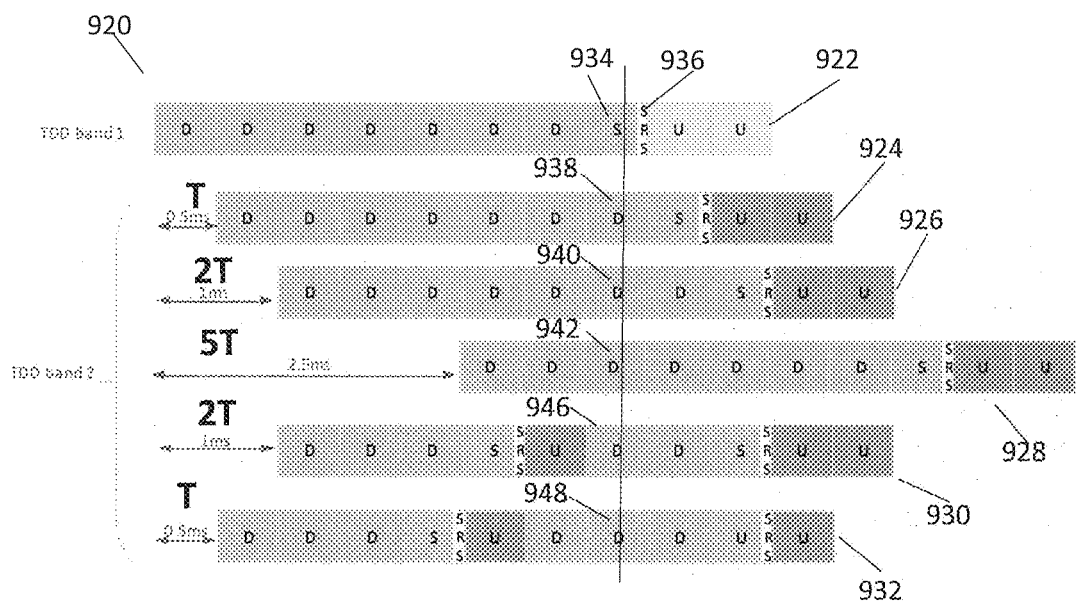

FIGS. 9A and 9B illustrate another embodiment for constructing a frame structure for a CA frame according to this disclosure. In the embodiment illustrated in FIGS. 7A through 7D and 8A through 8D, separation between a switching slot with SRS on SCC 512 and a switching slot on PCC 514 is achieved through deriving the frame structure of one of the frames from the frame structure of the other frame. However, this separation can also be achieved by providing a separation delay between a second frame and the first frame.

FIG. 9A illustrates a CA frame structure 900 includes frame 902 for band 1 and frame 904 for band 904. One of band 1 or band 2 is associated with SCC 512 and the other is associated with PCC 514. The frame structure of frame 902 and the frame structure of frame 904 may be different. Frame 902 includes N+1 slots 906, labeled as S0 through $S_N$ in FIG. 9A. Frame 904 also includes N+1 slots 908, also labeled S0 through $S_N$. As illustrated in FIG. 9A, each of slots 906 and slots 908 have a duration T. For example, N+1 may be 10 and T may be 0.5 ms. As illustrated in FIG. 9A, frame 904 is time shifted by an integer number of times T (nT) in order to shift frame 904 with respect to frame 902.

FIG. 9B illustrates examples of a CA frame structure 920 according to some embodiments. As illustrated in FIG. 9B, CA frame structure 920 includes frame 922 in band 1, which may be either SCC 512 or PCC 514. CA frame structure 920 also includes one of the illustrated frames, frames 924, 926, 928, 930, or 932, in band 2. Note that these are only example frame combinations and any combination of available frames can be used.

In the particular embodiment as illustrated in FIG. 9B, frame 922 is DDDDDDDSUU, where switching slot 934 includes an SRS 936. In one example, CA frame structure 920 includes frame 922 combined with frame 924. Frame 924 has the same structure as frame 922, DDDDDDDSUU, shifted in time by 1T. Consequently, SRS 936 is aligned with a downlink slot 938 and does not result in a throughput delay gap as was discussed above. Further, at least one uplink slot is in frame 924 is aligned with a downlink slot of frame 922 (the other uplink slot is aligned with a non-used uplink slot of frame 922).

In another example as illustrated in FIG. 9B, CA frame structure 920 includes frame 922 aggregated with band 2 frame 926. Frame 926 has the same structure as frame 922, DDDDDDDSUU, shifted in time by 2T. Consequently, SRS 936 aligns with downlink slot 940 and does not result in a throughput delay gap as was discussed above. Further, both uplink slots illustrated in frame 926 are aligned with downlink slots of frame 922.

In another example as illustrated in FIG. 9B, CA frame structure 920 includes frame 922 aggregated with band 2 frame 928. Frame 928 has the same structure as frame 922, DDDDDDDSUU, shifted in time by 5T. Consequently, SRS 936 aligns with downlink slot 942 of frame 928 and does not result in a throughput delay gap as was discussed above. Further, uplink slots in frame 928 align with downlink slots in frame 922.

In another example as illustrated in FIG. 9B, CA frame structure 920 includes frame 922 aggregated with band 2 frame 930. In this example, frame 930 has a different structure from frame 922, DDDSUDDSUU. As is illustrated, frame 930 is shifted by 2T from frame 922 so that SRS 936 aligns with downlink slot 946 rather than a switching slot. Consequently, SRS 936 does not result in a transmission delay, as is discussed above. Further, the uplink slots in frame 930 align with downlink slots in frame 922.

In another example as illustrated in FIG. 9B, CA frame structure 920 includes frame 922 aggregated with band 2 frame 932. Frame 932 is a different structure from frame 922, DDDSUDDSUU. As is illustrated, frame 932 is shifted by T from frame 922, which results in SRS 936 coinciding with downlink slot 948 and therefore does not result in a transmission delay. Additionally, the uplink slots in frame 932 align with downlink slots in frame 922.

In the embodiment illustrated in FIGS. 9A and 9B, in a carrier aggregation system the frame structure for one band is defined. An offset is then determined from the frame structure in the other band such that SRS symbols in the SCC band are aligned with DL slots in the PCC band. Further, in these example, at least one of the uplink slots and typically all of the uplink slots in the PCC band are aligned with downlink slots in the SCC band.

Figure 10A:
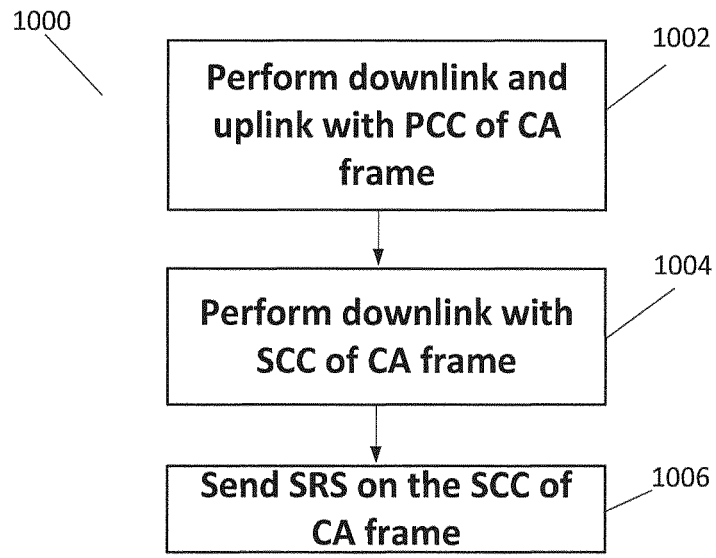
FIGS. 10A and 10B illustrate operation of a UE and a BS, respectively.
Figure 10B:
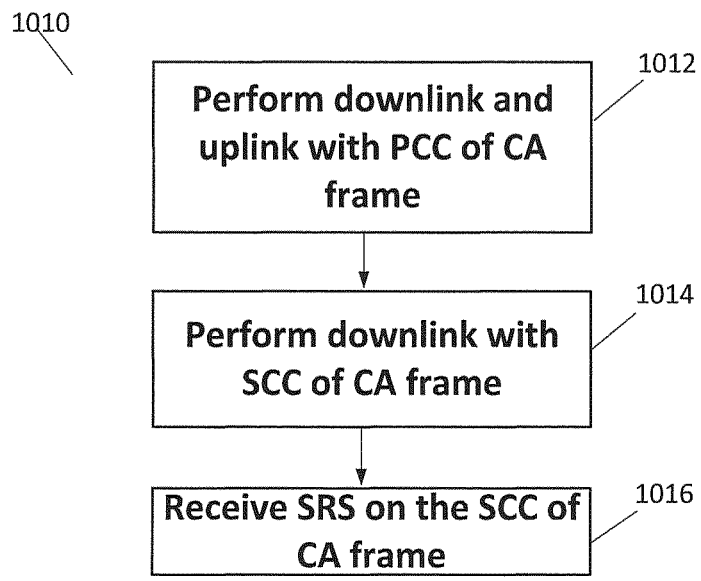

FIGS. 10A and 10B illustrate operation of a UE and a BS, respectively. As illustrated in FIG. 10A, operation 1000 of a UE in communication with a BS according to some embodiments. As illustrated in FIG. 10A, in step 1002 the UE performs downlink and uplink with the PCC frame of a CA frame, the PCC frame including a plurality of slots with one or more downlink slots, one or more uplink slots, and one or more switching slots. In step 1004, the UE performs downlink with the SCC frame, the SCC frame including a plurality of slots with one or more downlink slots, one or more uplink slots, and one or more switching slots. In step 1006, the UE then sends an SRS on the SCC of the CA frame. The CA frame is such that the SRS on the SCC frame is aligned with a downlink slot on the PCC frame. In some embodiments, the CA frame is also arranged such that an uplink slot in the PCC frame is aligned with a downlink slot in the SCC.

As illustrated in FIG. 10B, operation 1010 of a BS in communication with a UE according to some embodiments. As illustrated in FIG. 10B, in step 1012 the BS performs downlink and uplink with the PCC frame of a CA frame, the PCC frame including a plurality of slots with one or more downlink slots, one or more uplink slots, and one or more switching slots. In step 1014, the BS performs downlink with the SCC frame, the SCC frame including a plurality of slots with one or more downlink slots, one or more uplink slots, and one or more switching slots. In step 1016, the BS then receives an SRS on the SCC of the CA frame. The CA frame is such that the SRS on the SCC frame is aligned with a downlink slot on the PCC frame. In some embodiments, the CA frame is also arranged such that an uplink slot in the PCC frame is aligned with a downlink slot in the SCC.

Consequently, in some aspects, a UE is presented that performs uplink and downlink with a BS with a PCC frame of a CA frame, the PCC frame including one or more uplink slots, one or more downlink slots, and one or more switching slots. The UE performs downlink with a SCC frame of the CA frame, the SCC frame including one or more uplink slots, one or more downlink slots, and one or more switching slots. The UE sends an SRS within the SCC frame. In some aspects, the CA frame is arranged such that the SRS on the SCC is aligned with a downlink slot on the PCC frame. In some aspects, the CA frame is arranged such that an uplink slot on the PCC frame is aligned with a downlink slot on the SCC frame.

Furthermore, in some aspects, a BS is presented that performs uplink and downlink with a UE with a PCC frame of a CA frame, the PCC frame including one or more uplink slots, one or more downlink slots, and one or more switching slots. The BS performs downlink with a SCC frame of the CA frame, the SCC frame including one or more uplink slots, one or more downlink slots, and one or more switching slots. The BS receives an SRS within the SCC frame. In some aspects, the CA frame is arranged such that the SRS on the SCC is aligned with a downlink slot on the PCC frame. In some aspects, the CA frame is arranged such that an uplink slot on the PCC frame is aligned with a downlink slot on the SCC frame.

Aspects of the present disclosure includes the following:

Aspect 1 includes a method of operating a user equipment (UE) in communications with a base station (BS), comprising: performing downlink and uplink with the BS using a primary frame on a first time-division-duplexed (TDD) band of a primary component carrier (PCC), wherein the primary frame has a primary frame structure that includes a plurality of slots with one or more downlink slots, one or more uplink slots, and one or more switching slots; performing downlink with the BS using a secondary frame on a second band of a secondary component carrier (SCC), wherein the second frame has a secondary frame structure that includes a plurality of slots having one or more downlink slots, one or more uplink slots, and one or more switching slots; and sending a sounding reference signal (SRS) on the SCC, wherein the primary frame and the secondary frame form a carrier aggregation (CA) frame structure where the SRS on the secondary frame of the SCC is aligned with a downlink slot on the primary frame of the PCC.

Aspect 2 includes a method of aspect 1, wherein the primary frame and the secondary frame are configured such that an uplink slot of the primary frame is aligned with a downlink slot of the secondary frame.

Aspect 3 includes a method of aspects 1-2, wherein the CA frame structure is determined by segregating the plurality of slots of the primary frame structure into a first section and a second section; and deriving the secondary frame structure by switching order of the first section and the second section.

Aspect 4 includes a method of aspects 1-2, wherein the CA frame structure is determined by segregating the plurality of slots of the secondary frame structure into a first section and a second section; and deriving the primary frame structure by switching order of the first section and the second section.

Aspect 5 includes a method of aspects 1-4, wherein TDD band of the PCC and the SCC is a N41 band and N79 band.

Aspect 6 includes a method of aspects 1-5, wherein the CA frame structure is determined by time offsetting the primary frame from the secondary frame by an integer number of time durations T, the time duration T being the duration of each of the slots in the plurality of slots of the primary frame and the secondary frame.

Aspect 7 includes a method of aspects 1-5, wherein, wherein the CA frame structure is determined by time offsetting the secondary frame from the primary frame by an integer number of time durations T, the time duration T being the duration of each of the slots in the plurality of slots in the primary frame and the secondary frame.

Aspect 8 includes a user equipment (UE) apparatus, comprising: a processor; a memory coupled to the processor, the memory including data and instructions to be executed on the processor; a frame module that stores a carrier aggregation (CA) frame structure; a communications module coupled to receive downlink and transmit uplink according to CA frame structure; a transceiver coupled to the communications module to transmit and receive according to the CA frame structure; and antennas coupled to the transceiver to transmit and receive in a first time division duplexed (TDD) band of a primary component carrier (PCC) and in a second TDD band of a secondary carrier component according to the CA frame structure, wherein the processor executes instructions to perform downlink and uplink with a base station (BS) using a primary frame on a first time-division-duplexed (TDD) band of a primary component carrier (PCC), wherein the primary frame has a primary frame structure that includes a plurality of slots with one or more downlink slots, one or more uplink slots, and one or more switching slots; perform downlink with the BS using a secondary frame on a second band of a secondary component carrier (SCC), wherein the second frame has a secondary frame structure that includes a plurality of slots having one or more downlink slots, one or more uplink slots, and one or more switching slots; and send a sounding reference signal (SRS) on the SCC, wherein the primary frame and the secondary frame form a carrier aggregation (CA) frame structure where the SRS on the secondary frame of the SCC is aligned with a downlink slot on the primary frame of the PCC.

Aspect 9 includes a UE apparatus of aspect 8, wherein the primary frame and the secondary frame are configured such that an uplink slot of the primary frame is aligned with a downlink slot of the secondary frame.

Aspect 10 includes a UE apparatus of aspects 8-9, wherein the CA frame structure is determined by segregating the plurality of slots of the primary frame structure into a first section and a second section; and deriving the secondary frame structure by switching order of the first section and the second section.

Aspect 11 includes a UE apparatus of aspects 8-9, wherein the CA frame structure is determined by segregating the plurality of slots of the secondary frame structure into a first section and a second section; and deriving the primary frame structure by switching order of the first section and the second section.

Aspect 12 includes a UE apparatus of aspects 8-11, wherein TDD band of the PCC and the SCC is a N41 band and N79 band.

Aspect 13 includes a UE apparatus of aspects 8-12, wherein the CA frame structure is determined by time offsetting the primary frame from the secondary frame by an integer number of time durations T, the time duration T being the duration of each of the slots in the plurality of slots of the primary frame and the secondary frame.

Aspect 14 includes a UE apparatus of aspects 8-12, wherein the CA frame structure is determined by time offsetting the secondary frame from the primary frame by an integer number of time durations T, the time duration T being the duration of each of the slots in the plurality of slots in the primary frame and the secondary frame.

Aspect 15 includes a method of operating a base station (BS) in communications with a user equipment (UE), comprising: performing downlink and uplink with the UE using a primary frame on a first time-division-duplexed (TDD) band of a primary component carrier (PCC), wherein the primary frame has a primary frame structure that includes a plurality of slots with one or more downlink slots, one or more uplink slots, and one or more switching slots; performing downlink with the UE using a secondary frame on a second band of a secondary component carrier (SCC), wherein the second frame has a secondary frame structure that includes a plurality of slots having one or more downlink slots, one or more uplink slots, and one or more switching slots; and receiving a sounding reference signal (SRS) on the SCC, wherein the primary frame and the secondary frame form a carrier aggregation (CA) frame structure where the SRS on the secondary frame of the SCC is aligned with a downlink slot on the primary frame of the PCC.

Aspect 16 includes a method of aspect claim 15, wherein the primary frame and the secondary frame are further configured such that an uplink slot of the primary frame is aligned with a downlink slot of the secondary frame.

Aspect 17 includes a method of aspects 15-16, wherein the CA frame structure is determined by segregating the plurality of slots of the primary frame structure into a first section and a second section; and deriving the secondary frame structure by switching order of the first section and the second section.

Aspect 18 includes a method of aspects 15-16, wherein the CA frame structure is determined by segregating the plurality of slots of the secondary frame structure into a first section and a second section; and deriving the primary frame structure by switching order of the first section and the second section.

Aspect 19 includes a method of aspects 15-18, wherein TDD band of the PCC and the SCC is a N41 band and N79 band.

Aspect 20 includes a method of aspects 15-19, wherein the CA frame structure is determined by time offsetting the primary frame from the secondary frame by an integer number of time durations T, the time duration T being the duration of each of the slots in the plurality of slots of the primary frame and the secondary frame.

Aspect 21 includes a method of aspects 15-19, wherein the CA frame structure is determined by time offsetting the secondary frame from the primary frame by an integer number of time durations T, the time duration T being the duration of each of the slots in the plurality of slots in the primary frame and the secondary frame.

Aspect 22 includes a base station (BS), comprising: a processor; a memory coupled to the processor, the memory including data and instructions to be executed on the processor; a frame module that stores a carrier aggregation (CA) frame structure; a communications module coupled to transmit downlink and receive uplink according to CA frame structure; a transceiver coupled to the communications module to transmit and receive according to the CA frame structure; and antennas coupled to the transceiver to transmit and receive in a first time division duplexed (TDD) band of a primary component carrier (PCC) and in a second TDD band of a secondary carrier component according to the CA frame structure, wherein the processor executes instructions to perform downlink and uplink with a user equipment (UE) using a primary frame on a first time-division-duplexed (TDD) band of a primary component carrier (PCC), wherein the primary frame has a primary frame structure that includes a plurality of slots with one or more downlink slots, one or more uplink slots, and one or more switching slots; perform downlink with the UE using a secondary frame on a second band of a secondary component carrier (SCC), wherein the second frame has a secondary frame structure that includes a plurality of slots having one or more downlink slots, one or more uplink slots, and one or more switching slots; and receive a sounding reference signal (SRS) on the SCC, wherein the primary frame and the secondary frame form a carrier aggregation (CA) frame structure where the SRS on the secondary frame of the SCC is aligned with a downlink slot on the primary frame of the PCC.

Aspect 23 includes a BS of aspect 22, wherein the primary frame and the secondary frame are further configured such that an uplink slot of the primary frame is aligned with a downlink slot of the secondary frame.

Aspect 24 includes a BS of aspects 22-23, wherein the CA frame structure is determined by segregating the plurality of slots of the primary frame structure into a first section and a second section; and deriving the secondary frame structure by switching order of the first section and the second section.

Aspect 25 includes a BS of aspects 22-23, wherein the CA frame structure is determined by segregating the plurality of slots of the secondary frame structure into a first section and a second section; and deriving the primary frame structure by switching order of the first section and the second section.

Aspect 26 includes a BS of aspects 22-25, wherein TDD band of the PCC and the SCC is a N41 band and N79 band.

Aspect 27 includes a BS of aspects 22-26, wherein the CA frame structure is determined by time offsetting the primary frame from the secondary frame by an integer number of time durations T, the time duration T being the duration of each of the slots in the plurality of slots of the primary frame and the secondary frame.

Aspect 28 includes a BS of aspects 22-26, wherein the CA frame structure is determined by time offsetting the secondary frame from the primary frame by an integer number of time durations T, the time duration T being the duration of each of the slots in the plurality of slots in the primary frame and the secondary frame.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of operating a user equipment (UE) in communications with a base station (BS), comprising:
    performing downlink and uplink with the BS using a primary frame on a first time-division-duplexed (TDD) band of a primary component carrier (PCC), wherein the primary frame has a primary frame structure that includes a plurality of slots with one or more downlink slots, one or more uplink slots, and one or more switching slots;
    performing downlink with the BS using a secondary frame on a second band of a secondary component carrier (SCC), wherein the second frame has a secondary frame structure that includes a plurality of slots having one or more downlink slots, one or more uplink slots, and one or more switching slots; and
    sending a sounding reference signal (SRS) on the SCC, wherein the primary frame and the secondary frame form a carrier aggregation (CA) frame structure where the SRS on the secondary frame of the SCC is aligned with a downlink slot on the primary frame of the PCC.

2. The method of operating a UE according to claim 1, wherein the primary frame and the secondary frame are configured such that an uplink slot of the primary frame is aligned with a downlink slot of the secondary frame.

3. The method of operating a UE according to claim 2, wherein the CA frame structure is determined by
    segregating the plurality of slots of the primary frame structure into a first section and a second section; and
    deriving the secondary frame structure by switching order of the first section and the second section.

4. The method of operating a UE according to claim 2, wherein the CA frame structure is determined by
    segregating the plurality of slots of the secondary frame structure into a first section and a second section; and
    deriving the primary frame structure by switching order of the first section and the second section.

5. The method of operating a UE according to claim 2, wherein TDD band of the PCC and the SCC is a N41 band and N79 band.

6. The method of operating a UE according to claim 2, wherein the CA frame structure is determined by time offsetting the primary frame from the secondary frame by an integer number of time durations T, the time duration T being the duration of each of the slots in the plurality of slots of the primary frame and the secondary frame.

7. The method of operating a UE according to claim 2, wherein the CA frame structure is determined by time offsetting the secondary frame from the primary frame by an integer number of time durations T, the time duration T being the duration of each of the slots in the plurality of slots in the primary frame and the secondary frame.

8. A user equipment (UE) apparatus, comprising:
a processor;
a memory coupled to the processor, the memory including data and instructions to be executed on the processor;
a frame module that stores a carrier aggregation (CA) frame structure;
a communications module coupled to receive downlink and transmit uplink according to CA frame structure;
a transceiver coupled to the communications module to transmit and receive according to the CA frame structure; and
antennas coupled to the transceiver to transmit and receive in a first time division duplexed (TDD) band of a primary component carrier (PCC) and in a second TDD band of a secondary carrier component according to the CA frame structure,
wherein the processor executes instructions to
perform downlink and uplink with a base station (BS) using a primary frame on a first time-division-duplexed (TDD) band of a primary component carrier (PCC), wherein the primary frame has a primary frame structure that includes a plurality of slots with one or more downlink slots, one or more uplink slots, and one or more switching slots;
perform downlink with the BS using a secondary frame on a second band of a secondary component carrier (SCC), wherein the second frame has a secondary frame structure that includes a plurality of slots having one or more downlink slots, one or more uplink slots, and one or more switching slots; and
send a sounding reference signal (SRS) on the SCC,
wherein the primary frame and the secondary frame form a carrier aggregation (CA) frame structure where the SRS on the secondary frame of the SCC is aligned with a downlink slot on the primary frame of the PCC.

9. The UE apparatus of claim 8, wherein the primary frame and the secondary frame are configured such that an uplink slot of the primary frame is aligned with a downlink slot of the secondary frame.

10. The UE apparatus of claim 9, wherein the CA frame structure is determined by
segregating the plurality of slots of the primary frame structure into a first section and a second section; and
deriving the secondary frame structure by switching order of the first section and the second section.

11. The UE apparatus of claim 9, wherein the CA frame structure is determined by
segregating the plurality of slots of the secondary frame structure into a first section and a second section; and
deriving the primary frame structure by switching order of the first section and the second section.

12. The UE apparatus of claim 9, wherein TDD band of the PCC and the SCC is a N41 band and N79 band.

13. The UE apparatus of claim 9, wherein the CA frame structure is determined by time offsetting the primary frame from the secondary frame by an integer number of time durations T, the time duration T being the duration of each of the slots in the plurality of slots of the primary frame and the secondary frame.

14. The UE apparatus of claim 9, wherein the CA frame structure is determined by time offsetting the secondary frame from the primary frame by an integer number of time durations T, the time duration T being the duration of each of the slots in the plurality of slots in the primary frame and the secondary frame.

15. A method of operating a base station (BS) in communications with a user equipment (UE), comprising:
performing downlink and uplink with the UE using a primary frame on a first time-division-duplexed (TDD) band of a primary component carrier (PCC), wherein the primary frame has a primary frame structure that includes a plurality of slots with one or more downlink slots, one or more uplink slots, and one or more switching slots;
performing downlink with the UE using a secondary frame on a second band of a secondary component carrier (SCC), wherein the second frame has a secondary frame structure that includes a plurality of slots having one or more downlink slots, one or more uplink slots, and one or more switching slots; and
receiving a sounding reference signal (SRS) on the SCC, wherein the primary frame and the secondary frame form a carrier aggregation (CA) frame structure where the SRS on the secondary frame of the SCC is aligned with a downlink slot on the primary frame of the PCC.

16. The method of operating a base station (BS) according to claim 15, wherein the primary frame and the secondary frame are further configured such that an uplink slot of the primary frame is aligned with a downlink slot of the secondary frame.

17. The method of operating a base station (BS) according to claim 16, wherein the CA frame structure is determined by
segregating the plurality of slots of the primary frame structure into a first section and a second section; and
deriving the secondary frame structure by switching order of the first section and the second section.

18. The method of operating a base station (BS) according to claim 16, wherein the CA frame structure is determined by
segregating the plurality of slots of the secondary frame structure into a first section and a second section; and
deriving the primary frame structure by switching order of the first section and the second section.

19. The method of operating a base station (BS) according to claim 16, wherein TDD band of the PCC and the SCC is a N41 band and N79 band.

20. The method of operating a base station (BS) according to claim 16, wherein the CA frame structure is determined by time offsetting the primary frame from the secondary frame by an integer number of time durations T, the time duration T being the duration of each of the slots in the plurality of slots of the primary frame and the secondary frame.

21. The method of operating a base station (BS) according to claim 16, wherein the CA frame structure is determined by time offsetting the secondary frame from the primary frame by an integer number of time durations T, the time duration T being the duration of each of the slots in the plurality of slots in the primary frame and the secondary frame.

22. A base station (BS), comprising:
a processor;

a memory coupled to the processor, the memory including data and instructions to be executed on the processor;

a frame module that stores a carrier aggregation (CA) frame structure;

a communications module coupled to transmit downlink and receive uplink according to CA frame structure;

a transceiver coupled to the communications module to transmit and receive according to the CA frame structure; and antennas coupled to the transceiver to transmit and receive in a first time division duplexed (TDD) band of a primary component carrier (PCC) and in a second TDD band of a secondary carrier component according to the CA frame structure, wherein the processor executes instructions to perform downlink and uplink with a user equipment (UE) using a primary frame on a first time-division-duplexed (TDD) band of a primary component carrier (PCC), wherein the primary frame has a primary frame structure that includes a plurality of slots with one or more downlink slots, one or more uplink slots, and one or more switching slots;

perform downlink with the UE using a secondary frame on a second band of a secondary component carrier (SCC), wherein the second frame has a secondary frame structure that includes a plurality of slots having one or more downlink slots, one or more uplink slots, and one or more switching slots; and receive a sounding reference signal (SRS) on the SCC, wherein the primary frame and the secondary frame form a carrier aggregation (CA) frame structure where the SRS on the secondary frame of the SCC is aligned with a downlink slot on the primary frame of the PCC.

23. The BS of claim 22, wherein the primary frame and the secondary frame are further configured such that an uplink slot of the primary frame is aligned with a downlink slot of the secondary frame.

24. The BS of claim 23, wherein the CA frame structure is determined by
segregating the plurality of slots of the primary frame structure into a first section and a second section; and
deriving the secondary frame structure by switching order of the first section and the second section.

25. The BS of claim 23, wherein the CA frame structure is determined by
segregating the plurality of slots of the secondary frame structure into a first section and a second section; and
deriving the primary frame structure by switching order of the first section and the second section.

26. The BS of claim 23, wherein TDD band of the PCC and the SCC is a N41 band and N79 band.

27. The BS of claim 23, wherein the CA frame structure is determined by time offsetting the primary frame from the secondary frame by an integer number of time durations T, the time duration T being the duration of each of the slots in the plurality of slots of the primary frame and the secondary frame.

28. The BS of claim 23, wherein the CA frame structure is determined by time offsetting the secondary frame from the primary frame by an integer number of time durations T, the time duration T being the duration of each of the slots in the plurality of slots in the primary frame and the secondary frame.

* * * * *